United States Patent [19]
Chen et al.

[11] Patent Number: 5,642,478
[45] Date of Patent: Jun. 24, 1997

[54] DISTRIBUTED TRACE DATA ACQUISITION SYSTEM

[75] Inventors: Chin-Huang Chen; Mark C. Johnson, both of San Jose; Donald John Lang, Cupertino, all of Calif.

[73] Assignee: International Business Machines Corporation, Armonk, N.Y.

[21] Appl. No.: 366,185

[22] Filed: Dec. 29, 1994

[51] Int. Cl.⁶ ..................................................... G06F 11/08
[52] U.S. Cl. .................................. 395/183.21; 395/183.01
[58] Field of Search ....................... 395/183.21, 183.13, 395/600, 183.14, 183.15, 183.01

[56] References Cited

U.S. PATENT DOCUMENTS

| | | | |
|---|---|---|---|
| 4,437,184 | 3/1984 | Cork et al. | 395/183.21 |
| 4,598,364 | 7/1986 | Gum et al. | 395/183.14 |
| 4,674,089 | 6/1987 | Poret et al. | 371/25 |
| 4,782,461 | 11/1988 | Mick et al. | 364/900 |
| 4,845,615 | 7/1989 | Blasciak | 364/200 |
| 4,879,646 | 11/1989 | Iwasaki et al. | 364/200 |
| 4,985,894 | 1/1991 | Suga | 395/183.21 |
| 5,103,394 | 4/1992 | Blasciak | 395/575 |
| 5,115,502 | 5/1992 | Tallman | 395/183.13 |
| 5,121,501 | 6/1992 | Baumgartner et al. | 395/800 |
| 5,123,017 | 6/1992 | Simpkins et al. | 395/183.02 |
| 5,200,958 | 4/1993 | Hamilton et al. | 395/183.21 |
| 5,265,254 | 11/1993 | Blasciak et al. | 395/700 |
| 5,274,811 | 12/1993 | Borg et al. | 395/700 |
| 5,297,277 | 3/1994 | Dein et al. | 395/183.21 |
| 5,347,649 | 9/1994 | Alderson | 395/183.21 |
| 5,349,654 | 9/1994 | Bond et al. | 395/183.21 |

FOREIGN PATENT DOCUMENTS

| | | |
|---|---|---|
| 01-113841 | 5/1989 | Japan . |
| 02-81141 | 3/1990 | Japan . |

OTHER PUBLICATIONS

R.E. Eveland et al., "Technique for Storing Variable Length Data in a Circulating Buffer", IBM Technical Disclosure Bulletin, vol. 26, No. 1, Jun. 1983, pp. 86–88.

C.S. Graham et al., "Integrated Debug Tool", IBM Technical Disclosure Bulletin, vol. 32, No. 2, Jul. 1989, pp. 103–106.

V.A. Albaugh, "Combined Event Performance Trace for AIX", IBM Technical Disclosure Bulletin, vol. 32, No. 10A, Mar. 1990, p. 101.

J. Garrison et al., "Distributed Trace — A Facility to Trace Data and Code Flows in a Requester/Server Environment", IBM Technical Disclosure Bulletin, vol. 34, No. 4A, Sep. 1991, pp. 292–294.

M. G. Smith, "Real–Time, Trace–Driven Monitor for File System Performance", IBM Technical Disclosure Bulletin, vol. 34, No. 5, Oct. 1991, pp. 392–394.

R. B. Basham et al., "Microcode Data Event Logging in a Global Variable Environment", IBM Technical Disclosure Bulletin, vol. 35, No. 7, Dec. 1992, pp. 41–42.

W. C. Carlson et al., "Storing Variable Length Data in a Circular Buffer", IBM Technical Disclosure Bulletin, vol. 36, No. 03, Mar. 1993, pp. 491–493.

*Primary Examiner*—Robert W. Beausoliel, Jr.
*Assistant Examiner*—Ly V. Hua
*Attorney, Agent, or Firm*—Baker, Maxham, Jester & Meador

[57] ABSTRACT

A dedicated debugging facility for tracing hardware and software faults in a distributed digital system. An event data capture circuit is integrated into each processing node in a distributed multinode system for capturing event data within each node under software control. The captured event data is stored in one of a plurality of variable-length trace data buffers in the node processor memory space for analysis or transfer. These dedicated trace data acquisition circuits provide continuously available trace data for the hardware and software functions within each node. Each variable-length trace data entry is stored in the trace data buffers according to a format of this invention that permits collection and assembly of trace data entries from throughout the distributed multinode system to debug local hardware or software and to debug internodal interconnection hardware and software.

21 Claims, 3 Drawing Sheets

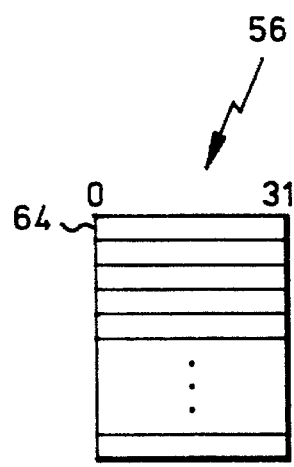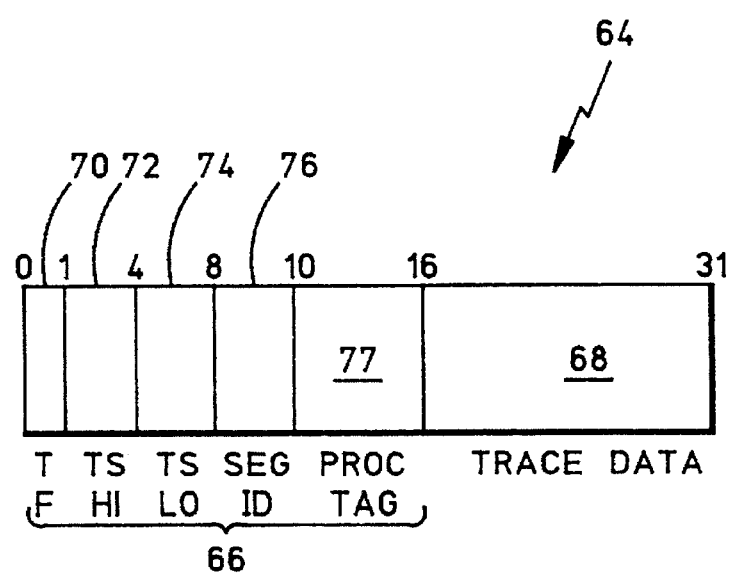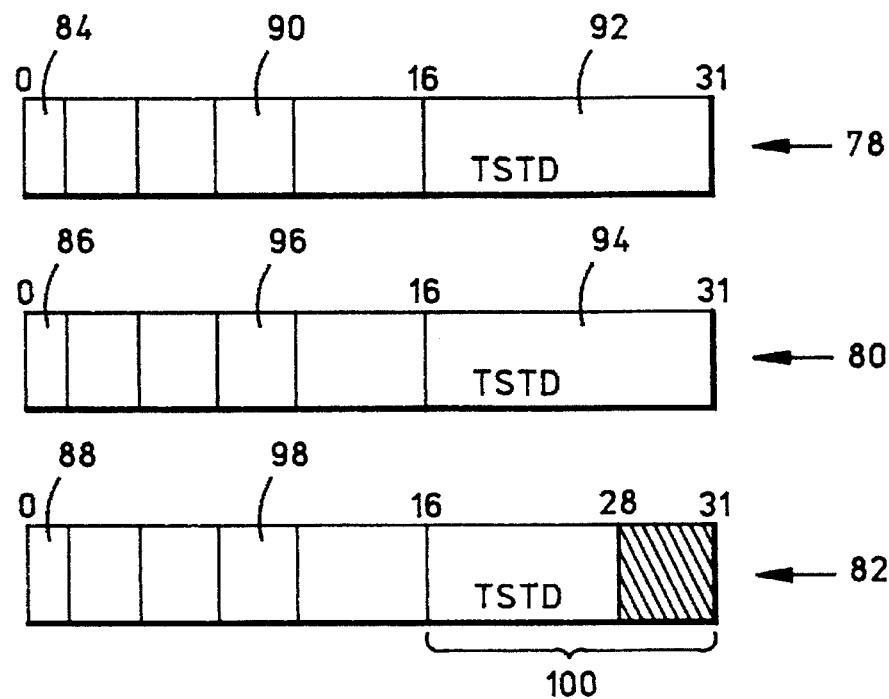
FIG. 4A
FIG. 4B
FIG. 5

DISTRIBUTED TRACE DATA ACQUISITION SYSTEM

BACKGROUND OF THE INVENTION

1. Field of the Invention

This invention relates generally to systems for capturing event data needed to isolate and correct defects in digital systems and particularly to an integrated facility for the continuous programmable acquisition of trace data in a distributed multiprocessor system.

2. Description of the Related Art

Some modern digital systems use a distributed processing architecture to achieve high performance and continuous availability. Although performance and availability in such a distributed processing system is significantly improved, system complexity and debugging difficulty are also increased, especially in digital systems employing very-large-scale integration (VLSI) hardware. Traditional facilities such as In-Circuit Emulation (ICE) and external logic analyzers are not always practical for debugging modern distributed processing systems.

Debugging distributed processing systems with logic analyzers is not feasible because of the number of logic analyzers required to obtain from multiple processors the trace data needed to isolate a system problem. Even with a sufficient number of logic analyzers, some of the necessary signals may not be available at external pinpoints in the distributed digital system. Distributed processing systems may be located remotely across buildings or cities. More importantly, even if the practitioner managed to attach many logic analyzers to the proper input/output (I/O) pins in the digital hardware, it is completely impractical to maintain tens, hundreds or even thousands of logic analyzers connected to every processor of a large distributed processing system at all times. Thus, the detection and analysis of a suspected problem devolves to a random procedure, where the practitioner connects several logic analyzers to some selected processors at some particular time, assuming hopefully that the suspected problem can be coaxed to again occur in the instrumented processors and not elsewhere in the system. When this fails, the practitioner is obliged to move logic analyzers from one processor to another in a pseudo-random fashion, hoping to eventually stumble across the suspected design flaw. As distributed processing systems increase in complexity, the probability of discovering and correcting system design problems falls so that the debug schedule ultimately must expand without limit, which is economically unacceptable. This economic restriction leads to arrival of digital systems at a user location with serious undiagnosed design flaws.

Separately, because of the volume, trace data generated by dozens of logic analyzers distributed across a digital system are often difficult to understand in context. A practitioner must examine data from one logic analyzer at a time and may not be able to simultaneously integrate data from many different logic analyzers. If data are stored for later analysis, the voluminous data entries must somehow be reassembled to properly depict the sequence of digital events throughout the distributed system. This serious problem has sharply limited debugging capability in distributed systems until now.

As is well-known in the art, digital design flaws are discovered and corrected in exponentially decreasing numbers over the various stages of design development. As the system design matures, diagnosis and cure of each new design flaw requires more time and effort. In a distributed digital system, these later "bugs" usually require analysis of large volumes of trace data assembled across many processors. Because of this, the practitioner may not be able to readily duplicate a system problem for which no data was acquired when first encountered. Conversely, acquisition and storage of debug data for all processors and all interfaces in a digital system all of the time is not feasible. Thus, the user is often obliged to assist as an unwilling partner in correcting these later bugs.

The increased density and performance of the new digital device technology also give rise to signal availability and speed problems. For instance, the event data needed for debugging may not be available at chip or card I/O pins suitable for connection to an external logic analyzer. This problem is exacerbated by increases in VLSI technology density. Similarly, increased logic speeds make it more difficult for a logic analyzer to keep up with device operating speed. Other hardware-related debugging problems include limited fan-out capacity in the VLSI chips connected to external logic analyzers and difficulties with event data synchronization across large numbers of logic analyzers operating at high speed. Finally, the usual ICE practices known in the art are often not feasible for debugging the latest systems where processor devices must be hard-soldered to a circuit card for performance and reliability purposes.

There is accordingly a clearly-felt need in the art for an improved debugging facility suitable for use in modern high-performance distributed digital processing systems. To appreciate the requirements for such a debugging system, note that debugging a distributed digital system includes (a) requirements for debugging software and firmware within each node of a distributed processing system, (b) requirements for debugging hardware within each node and (c) requirements for debugging both hardware and software underlying the internode data communications responsible for integrating the various node functions throughout the distributed digital system. Each of these separate issues requires a different debugging strategy. For instance, hardware design flaws are usually detected and corrected by "substitution", using ICE techniques known in the art, which are of little use in debugging system application software. Software is usually debugged using intrusive software analyzers, and internode message communication problems require analysis of global event data that are not available from within any particular node or combination of nodes.

The digital system art is replete with methods for resolving these three basic debugging issues, and most can be loosely classified as (1) in-circuit emulation (ICE) techniques, (2) dedicated hardware logic analyzer techniques, (3) intrusive software performance analyzer techniques using special interrupts and software "hooks", and (4) techniques using dedicated system hardware and software debugging elements.

Software debugging is often approached with some combination of external logic analyzer hardware and intrusive performance analyzer software. For instance, in U.S. Pat. No. 5,265,254, Blasciak et al. disclose a system of debugging software through the use of code markers inserted into spaces in the application source code during and after compilation. Blasciak et al. teach the addition of "intrusive" instructions or markers to the application software to produce simple, encoded memory references to memory or I/O locations that are always visible to an external logic analyzer as bus cycles but otherwise unused. While their technique is relatively unintrusive, their code markers are typically inserted at compile time or interactively during a debugging session and are not resident during normal system operation for capturing event data critical to unraveling an unexpected software glitch. Also, their technique requires external logical analyzer hardware, which is not feasible for large distributed systems.

In U.S. Pat. No. 5,274,811, Borg et al. disclose a method for quickly acquiring and using very long traces of mixed system and user memory references for debugging purposes by inserting intrusive code into the software undergoing debugging. Borg et at. store the results of their tracing operation until the application program execution can be interrupted to analyze the results of the tracing completed to date. By intermittently interrupting and analyzing, Borg et at. avoid the generation and storage of very long traces for later analysis and thereby avoid limitations on trace length. Thus, Borg et al. teach a useful solution to the general trace data length limitation known in the art and also avoid the external logic analyzer problem by using integrated hardware means for non-obtrusive generation of both software and hardware traces. However, they neither consider nor suggest methods for real-time debugging in a distributed system having many different processing nodes coupled together.

In Japanese patent JP 01-113841, the inventors describe a method for enhancing storage efficiency for trace data by discarding certain trace data that is unnecessary to the debugging procedure in a multi-tasking environment. Although the inventors consider means for accommodating the particular trace data duplication problems arising in a multi-tasking environment, they neither consider nor suggest methods for debugging in a distributed multiprocessor system.

Other practitioners have suggested improvements to various parts of the distributed data system debugging problem. For instance, V. A. Albaugh ("Combined Event Performance Trace For AIX", IBM Technical Disclosure Bulletin, Vol. 32, No. 10A, p. 101, March 1990) recommends a trace data collection mechanism consisting of a device driver, some trace recording routines and a process for reading the data and modifying the trace state. Albaugh uses intrusive software routines and a high-resolution timer for producing a multiplicity of time-stamped trace data entries, which are stored offline for later analysis and neither considers nor suggests solutions to the larger distributed general multiprocessor debugging problem. R. B. Basham et al. ("Microcode Data Event Logging in a Global Variable Environment", IBM Technical Disclosure Bulletin, Vol. 35, No. 7, pp. 41–42, December, 1992) discloses a programmable microcode mechanism for tracing bit manipulation of any specified data area in a microprocessor control store. Basham et al. use intrusive software to define and identify data of interest and to log their occurrence for future analysis. The performance degradation imposed by their technique limits its usefulness to debugging microcode during the chip development cycle. M. G. Smith ("Real-Time, Trace-Driven Monitor for File System Performance", IBM Technical Disclosure Bulletin, Vol. 34, No. 5, pp. 392–394, October, 1991) discloses a program that monitors a computer file system and I/O system in real-time to report performance event data over an arbitrarily long measurement interval. Smith uses intrusive software to capture and store events at all levels of the file system and to produce a comprehensive set of file and memory access statistics. None consider or suggest broader debugging techniques for distributed digital systems.

W. C. Carlson et al. ("Storing Variable Length Data in a Circular Buffer", IBM Technical Disclosure Bulletin, Vol. 36, No. 3, pp. 491–493, March, 1993) discloses a method for storing variable-length program trace data in a circular buffer to minimize storage time when extraction time is unimportant. Similarly, R. E. Eveland et al. ("Technique for Storing Variable Length Data in a Circulating Buffer", IBM Technical Disclosure Bulletin, Vol. 26, No. 1, pp. 86–88, June, 1983) discloses a method for using a variable-length circular buffer to avoid segmentation of variable-length trace data entries. In Japanese patent JP 02-81141, the inventors disclose a technique for improving trace buffer effectiveness by using a trace control bit in the trace buffer pointer to ensure storage only of particular trace data in the trace buffer. These are all useful solutions to the trace data entry length problem in debugging software but do not in themselves suggest solutions to the broader distributed system debugging issues discussed above.

Some practitioners propose improvements to the in-circuit emulation (ICE) or "substitution" technique used to debug hardware. For instance, in U.S. Pat. No. 4,674,089, Poret et at. disclose an ICE circuit that includes capture logic that monitors the contents of the program address register, the internal dam bus and various processor control lines and also includes trace data buffers for storing the captured event dam. Their ICE circuitry is included on the same silicon chip with the microprocessor but is left unused after completion of the microprocessor hardware debugging procedure. In U.S. Pat. No. 4,782,461, Mick et al. disclose a useful technique for the logical grouping of facilities within a computer development system to provide breakpoint control, trace control and device emulators for the design, debugging and testing of computer systems. The Mick et al. system is essentially an in-circuit emulator for VLSI devices. Neither Mick et at. nor Poret et al. consider nor suggest improvements for debugging distributed digital processors.

Some practitioners propose improved software performance analyzer techniques for debugging distributed multiprocessor systems. For instance, J. Garrison ("Distributed Trace; a Facility to Trace Data and Code Flows in a Requester/Server Environment", IBM Technical Disclosure Bulletin, Vol. 34, No. 4A, pp. 292–294, September, 1991) proposes a distributed trace (DT) facility for intrusively debugging concurrent processes in a processing network under the OS/2 operating system. Garrison et al. limit their teachings to instruction-level tracing in a few targeting operating systems and neither consider nor suggest improved procedures the debugging of distributed multinode systems.

Other practitioners describe software debugging techniques that rely on dedicated hardware and/or software facilities, often in conjunction with external logic analyzer hardware. For instance, in U.S. Pat. No. 4,879,646 Iwasaki et al. disclose a microprocessor chip design that includes a multistage pipeline structure dedicated to editing trace memory contents and tracing operations during system debugging. Iwasaki et at. essentially describe a dedicated on-chip hardware facility for tracing microprocessor instructions in advance so that the stored traces can be later analyzed to improve software debugging efficiency. They neither consider nor suggest solutions to the broader debugging requirements encountered in multinode distributed systems.

In U.S. Pat. No. 5,121,501, Baumgartner et at. disclose a method and apparatus for debugging software applications by inserting a limited number of software "hooks". They use a microprocessor system having a dedicated "output bus" for forwarding event dam associated with the "hooks".

Although Baumgartner et al. propose a useful technique for continuous production of high-volume performance trace data for an extended time, they require external logic analyzer hardware (a second processor) together with intrusive application software modifications to accomplish this result and neither consider nor suggest how their technique can be usefully adapted to debug a distributed multinode system.

In U.S. Pat. Nos. 4,845,615 and 5,103,394, Blasciak discloses a dedicated software performance analyzer facility for non-intrusively measuring six different software execution performance parameters. Blasciak measures memory activity in certain predetermined address ranges to produce performance data but neither considers nor suggests techniques for capturing the general range of event data necessary to effectively debug a distributed multinode processing system.

C. S. Graham et al. ("Integrated Debug Tool", IBM Technical Disclosure Bulletin, Vol. 32, No. 2, pp. 103–106, July, 1989) disclose a dedicated software-debugging kernel that permanently resides in the base microcode operating system to enhance debugging of hardware and software in a single processing system. However, Graham et al. consider only instruction level tracing in a single processor and do not suggest how their permanent kernel technique can be expanded to resolve the distributed system debugging issues described above.

There is clearly a need in the art for a trace data acquisition system that avoids the above-recited deficiencies. Such a system should provide a debugging capability that remains indefinitely with the product in the field to assist in resolving software and system integration design flaws that encountered after factory release. The system should provide sufficient trace data to permit debugging of hardware and software as well as internodal integration and communications. These unresolved problems and deficiencies are clearly felt in the art and are solved by this invention in the manner described below.

SUMMARY OF THE INVENTION

This invention solves the problems described above by adding to each processing node in a distributed multinode system a dedicated capture circuit for capturing event data under software control within each node. The captured event data is stored for analysis or transfer in several variable-length trace data buffers in the node processor memory space of each node. These dedicated trace data acquisition elements provide continuously available trace data for debugging any hardware or software functions within each node. Each trace data entry in the variable-length trace data buffers is configured in a variable length according to a format of this invention. This format permits collection and assembly of trace data entries from throughout the distributed multinode system for debugging local hardware or software and for debugging internodal interconnection hardware and software.

It is an object of the system of this invention to obtain event data without external connections to the system hardware. It is another object of the system of this invention to provide event data that is not externally accessible. It is a feature of the system of this invention that the necessary logic analyzer functions are integrated into the hardware at each node to access all necessary event data without external logic analyzer connections.

It is another object of the system of this invention to capture all event data necessary for debugging upon the first occurrence of any hardware or software problem without recreating the problem. It is a feature of the system of this invention that event data is continuously acquired and stored as trace data entries in several trace data buffers. It is an advantage of the system of this invention that such trace data is available for debugging an unexpected hardware or software problem without recreating the problem.

It is another object of the system of this invention to provide a permanent trace data acquisition facility within a distributed digital system. It is a feature of the system of this invention that the hardware and software elements are permanently integrated into each node of the distributed multinode processing system so that the desired trace data can be obtained at any time during the system performance life without external hardware and without intrusive software.

It is yet another object of the system of this invention to provide trace data entries that can be assembled from many different nodes to reconstruct distributed hardware or software operation. It is a feature of the system of this invention that each trace data entry is formatted to include timestamp, node and process identification and interrupt level information sufficient for reconstruction of necessary debugging information across distributed processing nodes. It is another feature of the system of this invention that the debugging dam from various nodes can be merged under software control in a host processor node for debugging purposes. It is yet another feature of the system of this invention that trace data entries are configured as a series of linked blocks of trace data segments to accommodate variable-length trace data entry storage in fixed-length memory hardware.

The foregoing, together with other objects, features and advantages of this invention, can be better appreciated with reference to the following specification, claims and the accompanying drawing.

BRIEF DESCRIPTION OF THE DRAWING

For a more complete understanding of this invention, reference is now made to the following detailed description of the embodiments as illustrated in the accompanying drawing, wherein:

FIGS. 4A–4B show a preferred embodiment of the trace data block structure of this invention; and FIG. 5 shows the segmented storage format of the exemplary trace data entry from FIG. 3, according to this invention.

DETAILED DESCRIPTION OF THE PREFERRED EMBODIMENTS

Figure 1:
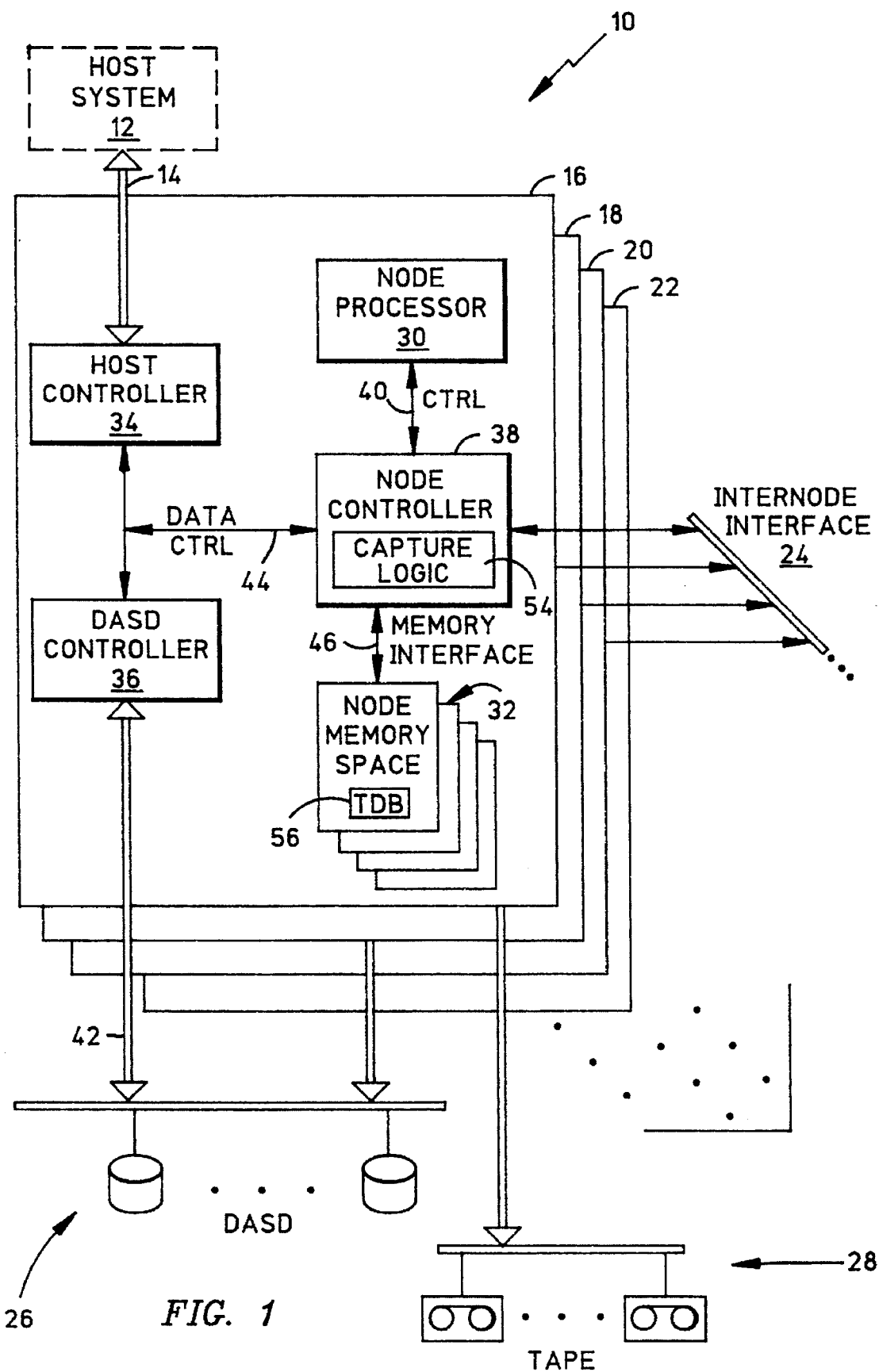
FIG. 1 is a functional block diagram of an illustrative embodiment of a distributed digital system incorporating the system of this invention.

FIG. 1 shows a distributed digital system 10 improved in accordance with this invention. System 10 is shown coupled to a host system 12 through an intersystem bus 14, but may also stand alone without connection to other systems. In FIG. 1, each of a plurality of nodes, exemplified by the nodes 16, 18, 20 and 22, are coupled together through an internode interface 24, depicted as a parallel bus. Internode interface 24 may be any useful distributed digital communications technique known in the art, such as a token ring or a Toms Link comprising multiple serial interfaces or cross-point switch connections, for instance, as well as the parallel bus depicted in FIG. 1. System 10 is configured to permit expansion by addition of more nodes and upgrading by substitution of selected nodes with upgraded hardware. As used herein, a processing node such as node 16 denominates a self-contained digital processing element dedicated to one or more predetermined system functions such as host processing, data storage, data communications, and the like. For instance, in FIG. 1, node 16 is configured to function as a host system interface and a device-specific interface for the direct access storage device (DASD) subsystem 26. Node 18 is configured to function as a device-specific interface for the tape storage subsystem 28. Node 20 is shown as limited to the device-unique processing function of interfacing with DASD subsystem 26 and no specific processing function of node 22 is shown in FIG. 1.

Each of the coupled nodes in system 10 includes at least one node processor, at least one node memory space and at least one node controller dedicated to supporting a specific node processing function. For instance, node 16 includes the node processor 30, the node memory space 32 and two node function controllers, shown as the host controller 34 and the DASD controller 36. The internal operation of node 16 is coordinated by the node controller 38, which includes the capture logic 54 of this invention. Memory space 32 includes the trace data buffers of this invention, exemplified by the trace data buffer 56.

Node processor 30 is preferably embodied as an integrated circuit (IC) microprocessor coupled to node controller 38 by an internal control bus 40. Host controller 34 may be embodied as an application-specific IC (ASIC) incorporating the special logic necessary for handling message traffic on intersystem bus 14. Similarly, DASD controller 36 may be embodied as an ASIC incorporating the special-purpose logic necessary for handling data and control signal traffic on the DASD bus 42. Both host controller 34 and DASD controller 36 are coupled to node controller 38 by an internal data/control bus 44. Node memory space 32 may be embodied as several banks of fast dynamic random access memory (DRAM) ICs or other RAM ICs known to be useful in the art. Memory space 32 is coupled to node controller 38 by the memory interface bus 46. Node controller 38 is preferably embodied as a single ASIC incorporating several internal processing functions, including the event data acquisition functions of this invention. Node controller 38 is coupled to all other nodes in system 10 by way of internode interface 24.

Essentially, node controller 38 funnels both the data and control signals from one internal node bus to another. These message transfers may require different protocols and circuits within node controller 38 to perform the digital processing necessary to transfer data and control signals from one protocol to another, as shown in more detail in FIG. 2. Because node controller 38 operates as a "message center" within node 16, it is the preferred location for capturing the event data necessary for debugging hardware and software node functions. For instance, in FIG. 2, every message exchanged between node 16 and the other nodes within system 10 coupled to internode interface 24 passes through the internode protocol logic 48, wherein each message is reformatted as necessary before transfer to the internal bus protocol logic 50. Similarly, every node memory access, whether read or write, is passed through the error correction code (ECC) and memory access protocol logic 52. Logic 52 may include all necessary DRAM interface logic as well as any protocol changes necessary for transferring messages and control signals from either internal bus 40 or 44. The capture logic 54 of this invention is shown coupled to memory protocol logic 52 and internal bus protocol logic 50 so that all data and control signals are available to capture logic 54 during normal node processing.

Figure 2:
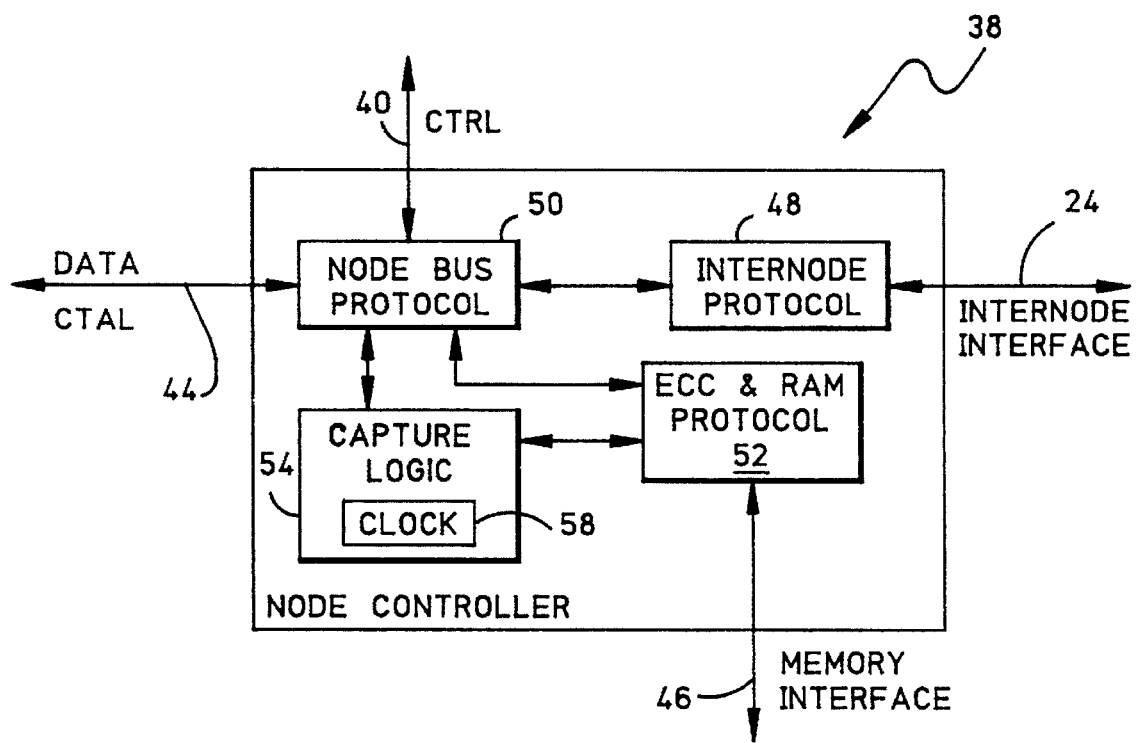
FIG. 2 is a functional block diagram illustrating in more detail the node controller from the system of FIG. 1.

In FIG. 2, capture logic 54 is shown as directly coupled to memory protocol logic 52, illustrating an important feature of this invention. That is, local node memory space is used for trace data buffers, exemplified by trace data buffer 56 shown in FIG. 1. Capture logic 54 is also shown having an internal clock 58, which should be tightly synchronized with such clocks in other nodes to provide reliable timestamps for the trace data entries in trace data buffer 56.

Thus, capture logic 54 of this invention solves the first important problem of gaining access to the message traffic that contains useful trace data without inhibiting normal processing efficiency in a distributed system. Capture logic 54 is integrated within a single ASIC with the node controller functions for node 16, thereby gaining direct connection to all message traffic of any interest for debugging purposes. The trace data entry format improvements of this invention solve the second (and more fundamental) problem of acquiring and integrating useful trace data from several independent nodes during normal system operation at full operating speed.

Because many processes may exist concurrently in each node and many nodes operate concurrently within system 10, an enormous amount of event data must be somehow assembled, organized, correlated and analyzed to extract useful debugging information. Local node memory space is limited and the allocated trace data buffers are filling constantly during operation, so regular transfers of trace data buffer contents must be made into nonvolatile storage within distributed system 10. After these data are transferred into "hard" external storage, they must be reassembled to accurately portray message transfers between each element within each node of the distributed system. Different assembly is required for instruction level tracing, application software level tracing or internode message transfer tracing. For instance, instruction level tracing may require memory access records for each executed instruction organized step-by-step. Software level tracing may require thread or process identification, node identification, and user-specified internal register or memory access information. Internode message transfer tracing may require node identification information, logical port number, and internal user-specified information. Each of these tracing types may require different filtering to eliminate trace data from unrelated parts of system 10 or to simplify the debugging process. Clearly, in view of these varying requirements, the size of any particular trace data entry transferred into a trace data buffer cannot be predetermined and must be freely adjustable. Also, the normal processing activities of, for instance, node 16 may not be slowed merely to accommodate trace data acquisition. The trace data buffer format of this invention satisfies these essential requirements and now described.

Figure 3:
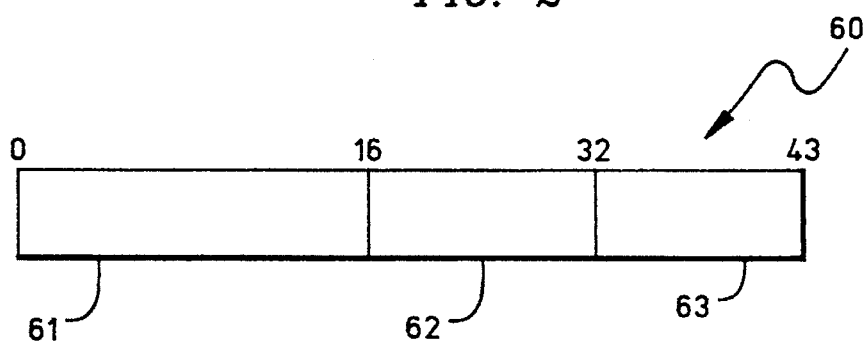
FIG. 3 shows an exemplary 44-byte trace data entry according to the format of this invention.

FIG. 3 shows an exemplary 44-byte trace data entry 60, which consists of an accumulation of trace-type specific data. Because the method of this invention requires a variable-sized trace-type specific field, each trace data entry, exemplified by trace data entry 60, must also be of variable length. However, for hardware speed purposes, trace buffer 56 is structured as a list of fixed-length data blocks, exemplified by the 32-byte data block 64 in FIG. 4A. Preferably, trace data buffer 56 in FIG. 4A occupies at least one MB of memory space, which accommodates perhaps 32K of the data blocks exemplified by data block 64.

To permit correlation of trace data from different sources of different processors, the trace data entries are stored as one or more trace data blocks, each having "architected" and "trace-type specific" fields. All trace data types or combinations of types must associate with an architected trace data field conforming to a predetermined fixed-length format in addition to a variable-length trace-type specific data field format. The fixed-length architected trace data field format may differ from one trace type to another but the length does not differ. For example, the architected trace data field may contain Event Identifier, Source Object Identifier, and Destination Object Identifier for the software trace type. The instruction trace type or internode message trace type may require different elements in the architected trace data field for their associated trace data entries, but the architected trace data field for a particular trace type never varies from a predetermined format. An architected trace data field may also be defined for two or more trace types, so that one fixed format may be used for all trace types, for instance. The trace-type specific data field may contain a cylinder, head and record number information for a software trace type, for example, or it may contain an ad hoc mixture of data for different trace types.

A separate trace data buffer (e.g., buffer 56) is reserved within node memory space 32 for each trace type or combination of types, such as the application software trace type or the instruction level trace type. For each trace type or combination of types, two trace data buffers are reserved for demultiplexing purposes. That is, while the first buffer of a pair is accumulating trace data entries, the second is transferring its contents under software control to external storage. This demultiplexing scheme may be applied to each of the several trace data buffer pairs required for the several trace types supported by the system of this invention, or to a single buffer pair where all trace data types are combined into a single buffer, for instance. Each trace data buffer such as trace data buffer 56 contains trace data entries for a single trace type or combination of types supported by a single architected trace data field format.

The method of this invention for supporting variable-sized trace data entries is now described in more detail. FIG. 4B shows data block 64 in more detail. Data block 64 includes a 16-byte architected header field 66 followed by a 16-byte trace data field 68. Depending on the trace data, the 16-byte trace data segment exemplified by field 68 in FIG. 4B can be stored into trace buffer 56 by hardware and/or software. The 16-byte architected header fields exemplified by field 66 in FIG. 4B are always stored by hardware in trace buffer 56 according to this invention. Some of the header field information may be initially supplied by software, however.

In FIG. 4B, header field 66 includes a 1-byte Trace Format (TF) field 70, which has the form of 0×TN. T is a 4-bit number that indicates the type of trace data, e.g., software trace data or instruction level trace data. N is a 4-bit number that indicates the number of valid bytes in the following trace data field 68. The value of N may be 4, 8, 12 or 0, where indicates that the entire 16-byte field is valid. Header field 66 includes two timestamp 0 fields, shown as the high timestamp field 72 and the low timestamp field 74. These embedded timestamps are used to reconstruct the sequence of events from the trace data entries collected from any number of the nodes within system 10 and represent an important feature of this invention.

Header field 66 also contains a segmentation identifier field 76 that indicates the entry to which the trace data segment 68 belongs and also includes an interrupt level entry to permit reconstruction of a long trace data entry across interrupts that may occur during trace data storage. The 2-byte segmentation identifier field 76 is formatted as I×S0, where I is a 4-bit interrupt priority level and S is a 4-bit serial number that identifies the segment position within the trace data entry of the associated trace data field 68. For instance, S=0 indicates that the accompanying trace data field 68 is the first 16 bytes of a new trace data entry and S=F indicates that the accompanying trace data field 68 is the final segment of the current trace data entry. This format can be modified to increase the range of values for S from 16 to 256 by using the last 4-bit field of the segment identifier field 76. The final 6 bytes of header field 66 are reserved for a process tag 77 that may be provided by software to identify the process, task or thread. While software may update process tag 77, it is also accessible by hardware.

The header information, including timestamps, segment identifiers, interrupt levels and process tags permit reassembly of all trace data entries from all trace buffers within every node so that a particular process can be reconstructed and displayed in a single screen for debugging purposes.

FIG. 5 shows how exemplary trace data entry 60 from FIG. 3 is stored in trace buffer 56 of FIG. 4A according to the linked data block format shown in FIG. 4B. The 44 bytes of trace data from entry 60 are reformatted and stored in three linked data blocks 78, 80 and 82. Trace format fields 84 and 86 of blocks 78 and 80, respectively, have 00 values because all 16 bytes of the trace data segments in these two blocks are valid. However, trace format field 88 in block 82 is valued at 0C, indicating that the last 4 bytes of the trace data field 100 are not valid.

The segmentation ID field 90 in block 78 is set to 0000 to show that block 78 is the first block of the trace data entry 60. Trace data field 92 includes the first 16 bytes of trace-specific trace data 61 from FIG. 3. The next 16 bytes of trace-specific trace data 62 from FIG. 3 are included in trace data field 94 of block 80 in FIG. 5 and segment identifier 96 is set to 0010 to indicate that block 80 is a continuation block within a trace data entry started earlier. Similarly, in block 82, segment identifier 98 is set to 0020 and trace data field 100 includes the last 12 bytes of trace specific trace data 63 from FIG. 3 together with four empty bytes. From this example, it can be readily appreciated that the trace data entry format of this invention permits variable-length trace data entry storage in fixed-length memory blocks at hardware speeds. Moreover, the dual-buffer demultiplexing scheme of this invention avoids any volume limit on trace data accumulation and avoids slowing or interrupting node processing functions when offloading trace data to external storage.

A practitioner may use the system of this invention to capture trace data in one or more trace buffers and may use one or more of the capabilities provided by this invention to localize and identify design flaws in hardware or software. This invention permits trace data to be merged from one or more trace buffers and permits the trace data to be sorted according to timestamp, and/or process tag fields. The trace data may be filtered to eliminate entries that do not pertain to the particular problem at hand, with filters based on process tags, interrupt levels or architected data fields. This invention may also be used to continuously log trace data and performance data on disk, tape or other external non-volatile storage media without slowing other system functions. Because all trace data capture functions are included in integrated hardware within each node, any distributed system including the system of this invention may incorporate trace conditions stored in a non-volatile media and activated at system power-up. Thus, if a problem occurs during operation following delivery to an end-user, the necessary trace data is immediately captured and stored to permit analysis and correction of the flaw without the usual need to reconstruct the problem.

Of course, trace data acquisition may be started and stopped or filtered by software control. Preferably, trace data acquisition defaults to the "on" state to continually collect and store trace data in local node memory. If desired, the trace data buffers can be repeatedly overwritten without saving any data, for instance. Because the capture logic is integrated in hardware and requires no external connections, trace data is always available for manipulation under software control, at the host, in a dedicated processing node, or elsewhere.

It can be understood by a person of ordinary skill in the art that the system of this invention as described can be embodied in part as computer software stored in some data storage means. The appropriate program means for executing the method of this invention may also be stored in an article of manufacture, such as a prerecorded floppy disk or other similar computer program product, for use with a data processing system. This product could include a storage medium and program means recorded thereon for directing a data processing system to facilitate the practice of the method of this invention. It is readily understood that such articles of manufacture also fall within the spirit and scope of this invention.

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

We claim:

1. In a distributed digital system of coupled nodes each for performing at least one digital processing function and each including a node processor, a node memory and one or more node controllers for exchanging messages with other nodes or devices, a distributed trace data acquisition system comprising:

a plurality of capture circuits each disposed in a corresponding one of said coupled nodes for capturing event data therefor;

a plurality of trace data buffers in each said node memory associated with one of said capture circuits each for storing one or more trace data entries for one or more of a plurality of trace formats, wherein each said trace data entry includes one or more linked data blocks each having a header data field and a trace data segment; and timestamp means in each said capture circuit for producing a timestamp for storage in said header field of each said linked data block;

wherein said plurality of trace formats comprises:
      a trace format for node processor instruction level tracing;
      a trace format for software level tracing; and
      a trace format for internode message level tracing.

2. The system of claim 1 wherein each said trace data buffer includes trace data entries for more than one said trace format.

3. The system of claim 2 wherein said header field of each said linked data block comprises:
   a trace format entry for identifying the associated said one or more trace formats;
   at least one timestamp for identifying a system time for the associated events;
   a linking entry for linking two said data blocks in a sequence; and
   a process tag and interrupt level for identifying the associated system process.

4. The system of claim 3 further comprising:
   memory interface means in said coupled node plurality for assembling said trace data entries from all said coupled nodes; and
   nonvolatile storage means coupled to said node plurality for storing said assembled trace data entries.

5. The system of claim 4 wherein each said capture circuit is embodied as a part of one or more integrated circuits disposed in the corresponding said node and is coupled to said node processor, to said node memory, and to each of said one or more node controllers for monitoring of all associated events.

6. In a distributed digital system of coupled nodes each for performing at least one digital processing function and each including a node processor, a node memory and one or more node controllers for exchanging messages with other nodes or devices, a distributed trace data acquisition system comprising:

a plurality of capture circuits each disposed in a corresponding one of said coupled nodes for capturing event data therefor;

a plurality of trace data buffers in each said node memory associated with one of said capture circuits each for storing one or more trace data entries for one or more of a plurality of trace formats, wherein each said trace data entry includes one or more linked data blocks each having a header data field and a trace data segment;

timestamp means in each said capture circuit for producing a timestamp for storage in said header field of each said linked data block;

memory interface means in said coupled node plurality for assembling said trace data entries from all said coupled nodes; and nonvolatile storage means coupled to said node plurality for storing said assembled trace data entries.

7. The system of claim 6 wherein each said capture circuit is embodied as a part of one or more integrated circuits disposed in the corresponding said node and is coupled to said node processor, to said node memory, and to each of said one or more node controllers for monitoring of all associated events.

8. The system of claim 7 wherein said plurality of trace formats comprises:
   a trace format for node processor instruction level tracing;
   a trace format for software level tracing; and
   a trace format for internode message level tracing.

9. In a distributed digital system of coupled nodes each for performing at least one digital processing function and each including a node processor, a node memory and one or more node controllers for exchanging messages with other nodes or devices, a distributed trace data acquisition system comprising:

a plurality of capture circuits each disposed in a corresponding one of said coupled nodes for capturing event data therefor;

a plurality of trace data buffers in each said node memory associated with one of said capture circuits each for storing one or more trace data entries for one or more of a plurality of trace formats, wherein each said trace data entry includes one or more linked data blocks each having a header data field and a trace data segment; and timestamp means in each said capture circuit for producing a timestamp for storage in said header field of each said linked data block;

wherein each said capture circuit is embodied as a part of one or more integrated circuits disposed in the corresponding said node and is coupled to said node processor, to said node memory, and to each of said one or more node controllers for monitoring of all associated events.

10. A method for operating a distributed digital system of coupled nodes each for performing at least one digital processing function and each including a node processor, a node memory, and one or more node controllers for exchanging messages with other nodes or devices, said method comprising the steps of:

(a) capturing event data in each said node;

(b) storing in each of a plurality of trace data buffers in said each node memory one or more trace data entries for one or more of a plurality of trace formats, wherein each said trace data entry includes one or more linked data blocks each having a header data field and a trace data segment; and (c) producing and storing a timestamp in each said header field;

wherein said storing step (b) further comprises the steps of:

(b.1) storing each said trace data entry for node processor instruction level tracing in a first said trace format;

(b.2) storing each said trace data entry for software level tracing in a second said trace format; and (b.3) storing each said trace data entry for internode message level tracing in a third said trace format.

11. The method of claim 10 wherein each said trace data buffer includes trace data entries for more than one said trace format.

12. The method of claim 11 further comprising the steps of:

(d) producing and storing in each said header field a trace format entry for identifying the associated said one or more trace formats;

(e) producing and storing in each said header field a linking entry for linking two said data blocks in a sequence; and (f) producing and storing in each said header field a process tag and interrupt level for identifying the associated system process.

13. The method of claim 12 further comprising the steps of:

(g) assembling said trace data entries from all said coupled nodes in one said node; and (h) storing said assembled trace data entries in a nonvolatile storage means.

14. The method of claim 13 wherein said capturing step (a) is performed in a capture circuit embodied as part of one or more integrated circuits in the corresponding said node and wherein said capture circuit is coupled to said node processor, to said node memory, and to each of said one or more node controllers for monitoring of all associated events.

15. A method for operating a distributed digital system of coupled nodes each for performing at least one digital processing function and each including a node processor, a node memory, and one or more node controllers for exchanging messages with other nodes or devices, said method comprising the steps of:

(a) capturing event data in each said node;

(b) storing in each of a plurality of trace data buffers in said each node memory one or more trace data entries for one or more of a plurality of trace formats, wherein each said trace data entry includes one or more linked data blocks each having a header data field and a trace data segment; and (c) producing and storing a timestamp in each said header field;

wherein said storing step (b) further comprises the steps of:

(b.1) storing each said trace data entry for node processor instruction level tracing in a first said trace format;

(b.2) storing each said trace data entry for software level tracing in a second said trace format; and (b.3) storing each said trace data entry for internode message level tracing in a third said trace format;

wherein each said trace data buffer includes trace data entries for more than one said trace format; and wherein the method further comprises the steps of:

(d) producing and storing in each said header field a trace format entry for identifying the associated said one or more trace formats;

(e) producing and storing in each said header field a linking entry for linking two said data blocks in a sequence;

(f) producing and storing in each said header field a process tag and interrupt level for identifying the associated system process;

(g) assembling said trace data entries from all said coupled nodes in one said node; and (h) storing said assembled trace data entries in a nonvolatile storage means.

16. The method of claim 15 wherein said capturing step (a) is performed in a capture circuit embodied as part of one or more integrated circuits in the corresponding said node and wherein said event capture controller is coupled to said node processor, to said node memory and to each of said one or more node controllers for monitoring of all associated events.

17. The method of claim 16 wherein said storing step (b) further comprises the steps of:

(b.1) storing each said trace data entry for node processor instruction level tracing in a first said trace format;

(b.2) storing each said trace data entry for software level tracing in a second said trace format; and (b.3) storing each said trace data entry for internode message level tracing in a third said trace format.

18. A method for operating a distributed digital system of coupled nodes each for performing at least one digital processing function and each including a node processor, a node memory, and one or more node controllers for exchanging messages with other nodes or devices, said method comprising the steps of:

(a) capturing event data in each said node;

(b) storing in each of a plurality of trace data buffers in said each node memory one or more trace data entries for one or more of a plurality of trace formats, wherein each said trace data entry includes one or more linked data blocks each having a header data field and a trace data segment; and (c) producing and storing a timestamp in each said header field;

wherein said capturing step (a) is performed in a capture circuit embodied as part of one or more integrated circuits in the corresponding said node and wherein said capture circuit is coupled to said node processor, to said node memory, and to each of said one or more node controllers to monitoring of all associated events.

19. A computer program product for use with a distributed digital system of coupled nodes each for performing at least one digital processing function and each including a node processor, a node memory, and one or more node controllers for exchanging messages with other nodes or devices, said computer program product comprising:

a recording medium;

means, recorded on said recording medium, for directing said distributed digital system to capture event data in each said node;

means, recorded on said recording medium, for directing said distributed digital system to store in each of a plurality of trace data buffers in said each node memory one or more trace data entries for one or more of a plurality of trace formats, wherein each said trace data entry includes one or more linked data blocks each having a header data field and a trace data segment;

means, recorded on said recording medium, for directing said distributed digital system to produce and store a time stamp in each said header field;

means, recorded on said recording medium, for directing said distributed digital system to produce and store in each said header field a trace format entry for identifying the associated said one or more trace formats;

means, recorded on said recording medium, for directing said distributed digital system to produce and store in each said header field a linking entry for linking two said data blocks in a sequence; and means, recorded on said recording medium, for directing said distributed digital system to produce and store in each said header field a process tag and interrupt level for identifying the associated system process.

20. The computer program product of claim 19 further comprising:

means, recorded on said recording medium, for directing said distributed digital system to store each said trace data entry for node processor instruction level tracing in a first said trace format;

means, recorded on said recording medium, for directing said distributed digital system to store each said trace data entry for software level tracing in a second said trace format; and means, recorded on said recording medium, for directing said distributed digital system to store each said trace data entry for internode level tracing in a third set trace format.

21. The computer program product of claim 20 further comprising:

means, recorded on said recording medium, for directing said distributed digital system to assemble said trace data entries from all said coupled nodes in one said node; and means, recorded on said recording medium, for directing said distributed digital system to store said assembled trace data entries in a non-volatile storage means.

* * * * *